(12) United States Patent
Dominguez et al.

(10) Patent No.: US 7,298,897 B1
(45) Date of Patent: Nov. 20, 2007

(54) OPTIMAL BINARIZATION OF GRAY-SCALED DIGITAL IMAGES VIA FUZZY REASONING

(75) Inventors: Jesus A. Dominguez, Orlando, FL (US); Steven J. Klinko, Titusville, FL (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 784 days.

(21) Appl. No.: 10/779,551

(22) Filed: Feb. 11, 2004

(51) Int. Cl.
*G06K 9/00* (2006.01)
(52) U.S. Cl. ....................... 382/172; 382/270
(58) Field of Classification Search ................ 382/133, 382/143, 172, 168, 128, 224, 270; 356/73.1
See application file for complete search history.

(56) References Cited

U.S. PATENT DOCUMENTS

| | | | | |
|---|---|---|---|---|
| 5,179,599 | A | 1/1993 | Formanek | 382/172 |
| 5,377,020 | A | 12/1994 | Smitt | 358/3.14 |
| 5,434,927 | A | 7/1995 | Brady et al. | 382/104 |
| 5,442,462 | A | 8/1995 | Guissin | 358/463 |
| 5,481,620 | A | 1/1996 | Vaidyanathan | 382/169 |
| 5,590,220 | A | 12/1996 | Takahashi | 382/203 |
| 5,627,908 | A * | 5/1997 | Lee et al. | 382/133 |
| 5,651,077 | A | 7/1997 | Dong et al. | 382/172 |
| 5,754,709 | A | 5/1998 | Moriya et al. | 382/274 |
| 5,761,326 | A | 6/1998 | Brady et al. | 382/103 |
| 5,799,111 | A | 8/1998 | Guissin | 382/254 |
| 5,828,776 | A * | 10/1998 | Lee et al. | 382/133 |
| 5,870,495 | A | 2/1999 | Mancuso et al. | 382/199 |
| 6,094,508 | A | 7/2000 | Acharya et al. | 382/199 |
| 6,285,801 | B1 | 9/2001 | Mancuso et al. | 382/268 |
| 6,347,153 | B1 | 2/2002 | Triplett et al. | 382/224 |
| 6,888,957 | B1 * | 5/2005 | Kim et al. | 382/143 |

OTHER PUBLICATIONS

Zhao et al., "A Technique of Three-Level Thresholding Based On Probability Partition and Fuzzy 3-Partition", IEEE, vol. 9, No. 3, Jun. 2001, pp. 469-479.*
Boskovitz et al., "An Adaptive Neruro-Fuzzy System for Automatic Image Segmentation and Edge Detection", IEEE, vol. 10, No. 2, Apr. 2002, pp. 247-262.*

(Continued)

*Primary Examiner*—Anh Hong Do
(74) *Attorney, Agent, or Firm*—Randall M. Heald; William A. Blake (57) ABSTRACT

A technique for finding an optimal threshold for binarization of a gray scale image employs fuzzy reasoning. A triangular membership function is employed which is dependent on the degree to which the pixels in the image belong to either the foreground class or the background class. Use of a simplified linear fuzzy entropy factor function facilitates short execution times and use of membership values between 0.0 and 1.0 for improved accuracy. To improve accuracy further, the membership function employs lower and upper bound gray level limits that can vary from image to image and are selected to be equal to the minimum and the maximum gray levels, respectively, that are present in the image to be converted. To identify the optimal binarization threshold, an iterative process is employed in which different possible thresholds are tested and the one providing the minimum fuzzy entropy measure is selected.

18 Claims, 4 Drawing Sheets

OTHER PUBLICATIONS

Dominguez, Jesus, et al., Implementation of a General Real-Time Visual Anomaly Detection System via Soft Computing, unknown date.

The 10th IEEE Conference on Fuzzy Systems, The University of Melbourne, Australia, Dec. 2-5, 2001.

Chang, Yan et al., Comparison of Five Conditional Probabilities in 2-level Image Thresholding Based on Baysian Formulation, The University of Sydney, Australia, pp. 1-6, unknown date.

Papamarkos, Nikos, A Technique for Fuzzy Document Binarization, Dept. of Electrical and Computer Engineering, Democritus University of Thrace, 67100 Xanthi, Greece, p. 152-156, unknown date.

Huang, Liang-Kai, et al., Image Thresholding By Minimizing the Measures of Fuzziness, Pattern Recognition, vol. 28, No. 1, pp. 41-51 (1995).

Otsu, N., A Threshold Selection Method From Gray-Level Histograms, IEEE Transactions on Systems, Man, and Cybennetics, vol. 9, No. 1, pp. 62-66 (1979).

* cited by examiner

Then, just sl
little south a
you'll likely t
of interactin
entry in Cha

FIG. 5D

OPTIMAL BINARIZATION OF GRAY-SCALED DIGITAL IMAGES VIA FUZZY REASONING

CROSS REFERENCE TO RELATED APPLICATIONS

This application is related to an application Ser. No. 10/783,295 entitled Image Edge Extraction Via Fuzzy Reasoning, which is commonly owned with the subject application,

ORIGIN OF THE INVENTION

The invention described herein was made in the performance of work under a NASA contract and is subject to the provisions of Public Law 96-517 (35 U.S.C. §202) in which the contractor has elected not to retain title.

BACKGROUND OF THE INVENTION

1. Field of the Invention

The present invention relates in general to a method and system for converting gray scale images to binary images which employs fuzzy reasoning to calculate an optimal binarization threshold value.

2. Description of the Background Art

Conversion of gray-scale digital images to binary images is of special interest because an image in binary format can be processed with very fast logical (Boolean) operators by assigning a binary value to each of the image's pixels. A binary one value indicates that the pixel belongs to the image foreground, which may represent an object in the image, while a binary zero value indicates that the pixel is darker and belongs to the image's background. Since most image display systems and software employ gray-scale images of 8 or more bits per pixel, the binarization of these images usually takes 2 extreme gray tones, black and white, which are ordinarily represented by 0 or 255, respectively, in an 8-bit gray-scale display environment.

Image thresholding is the simplest image segmentation approach for converting a gray-scale image to a binary image. It is actually a pattern classification procedure in which only one input feature is involved, this being the pixel intensity value. Usually a binary image is obtained from an 8-bit gray-scale image by thresholding the image and assigning either the low binary value (0) or the high (255) value to all gray levels based on the chosen threshold. Obviously, the threshold that is chosen has a critical importance since it controls the binary-based pattern classification that is obtained from the gray-scale image. The key issue is to choose an optimal threshold so that the number of misclassified image pixels is kept as low as possible. Since images can differ substantially from one another depending on the objects contained therein, the optimal threshold value can vary considerably from one image to the next. Thus, merely selecting a threshold value that is, for example, set at the average pixel intensity value for the gray-scale image will probably not provide the optimal threshold. If the threshold is selected incorrectly, substantial image information will likely be lost in the conversion to binary.

Numerous techniques have been employed to address the foregoing issue. The most accurate of these are non-interactive techniques that do not require selection of any process parameters to identify the optimal threshold. Such techniques automatically select the appropriate threshold based on an analysis of each image to be converted. An example of such a technique is disclosed by N. Otsu in *A Threshold Selection Method From Gray-Level Histograms*. IEEE Transaction on Systems, Man, and Cybernetics, 9(1):62-66, (1979) (hereinafter referred to as the Otsu method). In the Otsu method, the optimal threshold is determined by minimizing the two variance classes; total variance and in-class variance. In other words, the means/averages of the two classes (background and foreground) should be as well separated as possible and the variances (standard deviation) in both classes should be as small as possible. The Otsu method is basically based on selecting the lowest point between the two classes.

One particularly promising non-interactive approach is to employ fuzzy reasoning to determine the optimal threshold for binarization. Fuzzy reasoning is a logical reasoning technique that attempts to mimic more accurately how the human brain reasons. Under the fuzzy reasoning approach, a logic problem becomes more than deciding whether to assign a binary one or zero to a particular bit, pixel or parameter. Fuzzy reasoning goes one step further and recognizes that there is information contained in the degree to which a given value possesses a particular characteristic. For example, there is much less certainty that a particular pixel is in the background or foreground of the image if the pixel is very near a selected intensity threshold than if the value were far below or above the threshold. In a fuzzy reasoning approach, a multiple pixel digital image is defined as an array of fuzzy singletons, each having a membership value somewhere between 0.0 and 1.0 that denotes its degree of possessing some property (e.g., brightness, darkness, edginess, blurredness, texture etc.). For image binarization, the membership function is defined in terms of the degree a pixel having a particular gray level value in the image belongs to one of the two binary classes, background and foreground.

Once the membership function is formed, the function can be employed to determine the optimum threshold value that defines the boundary between background and foreground gray levels. This is accomplished by identifying the threshold value which results in the membership function providing the minimum fuzzy entropy for the image. The concept of fuzzy entropy is generally defined in information theory as a measure of information. In the context of fuzzy reasoning, the entropy is a measure of the degree of fuzziness. Thus, in the image binarization application, the goal is to select a threshold value that results in the minimum fuzziness or uncertainty.

An example of the use of fuzzy reasoning in image binarization is the method disclosed by Huang and Wang in *Image Thresholding by Minimizing the Measures of Fuzziness*, Pattern Recognition, Vol. 28, No. 1, pp 41-51 (1995) (hereinafter referred to as the Huang-Wang method). In the Huang-Wang method, a triangular membership function for the foreground and background classes is employed in which the graph of the function appears as two adjacent triangles that join at a selected threshold value. The peak values of the triangles occur at the average pixel intensity level for each class, where the membership value is 1.0. To identify the optimal threshold, an iterative trial and error technique is employed to identify the threshold that results in the minimum fuzzy entropy for the membership function. Shannon's entropy function, which is a logarithmic function in the shape of a parabola, is used as an entropy factor or cost function to calculate the entropy measure for a selected threshold. The threshold value that results in the minimum fuzzy entropy is then selected as the optimal threshold for binarization of the image.

Although the Huang-Wang method is fairly accurate and selects image thresholds that in general result in preservation of more image information than more conventional techniques, this increased conversion accuracy comes at the expense of substantially more computational power and execution time. For example, In tests comparing the Huang-Wang method to the Otsu method, the Huang-Wang typically required approximately 3 times the execution time than that of the Otsu method. The extended execution time is primarily due to the logarithmic nature of Shannon's entropy function which complicates the necessary calculations. In addition, use of Shannon's function restricts the values of the membership function to a range of 0.5 to 1.0, which limits accuracy. The limited range is necessary because the parabolic shape of Shannon's function has increasing values between membership values of 0.0 and 0.5, and decreasing values between membership values of 0.5 and 1.0. However, because the cost or entropy should decrease as the membership function value increases (as the fuzziness becomes smaller), the membership values below 0.5 cannot be employed when Shannon's function is selected as the entropy measure function. As a result of the foregoing, there is a need for a fuzzy reasoning based binarization technique that can operate effectively with reduced execution times.

SUMMARY OF THE INVENTION

The present invention addresses the foregoing need through provision of 20 an improved computational technique based on fuzzy entropy measure for finding an optimal binary image threshold for binarization. This new technique provides substantial improvements both in execution speed and accuracy over the previously discussed Huang-Wang method. As in the Huang-Wang method, the new method employs a triangular membership function which is dependent on the degree to which the pixels in the image belong to either the foreground class or the background class. However, the membership function in the subject invention differs from that in the Huang-Wang method in two notable ways. First, the membership values vary fully from 0.0 to 1.0 which improves measurement accuracy. Second, the membership function employs lower and upper bound gray level limits which are selected to be equal to the minimum and the maximum gray levels, respectively, that are present in the image to be converted. This also improves accuracy, especially where the image to be converted does not include pixel values at either end of the gray level spectrum. For example, predominantly dark images can be more accurately converted by eliminating the lighter gray level values that are not present in the image from the membership function.

The membership function can include values from 0.0 to 1.0 because a simplified fuzzy entropy function is employed that decreases for all membership values between 0.0 and 1.0. The entropy function is linear and is defined as 1 minus the membership value for each gray level. The use of a linear entropy factor function also simplifies the calculations that are necessary to determine the fuzzy entropy for each possible threshold value. As a result, execution times for the subject technique are typically on the order of 3 or more times shorter than the execution times using the Huang-Wang method.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE PREFERRED EMBODIMENT

Figure 1:
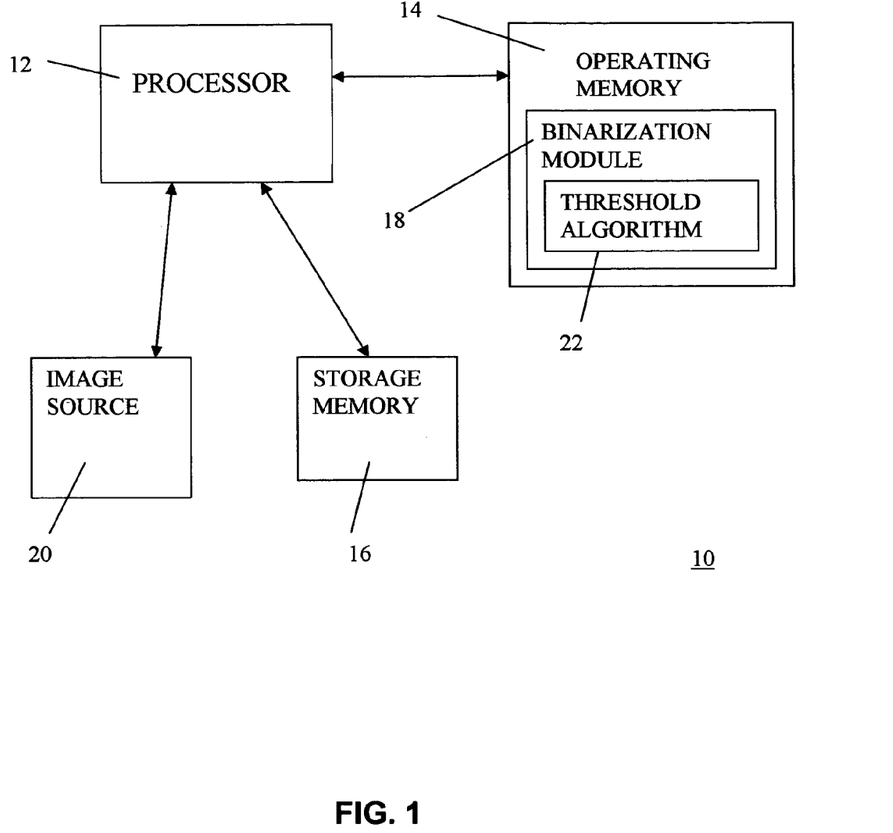
FIG. 1 is a block diagram of a computer system for converting gray scale images to binary images using a fuzzy reasoning based intensity threshold determination technique in accordance with the preferred embodiment of the present invention.

With reference to FIG. 1, a computer system 10 is illustrated which is configured to convert multiple bit gray-scale digital images into binary images using an image thresholding determination algorithm in accordance with a preferred embodiment of the present invention. The system 10 includes a processor 12 which is interfaced to an operating memory 14 and a storage memory 16, as is conventional. Loaded into the operating memory 14 is a binarization program or software module 18.

Gray-scale images to be converted to binary are either retrieved from the storage memory 16 or from an external image source 20 and are fed into the binarization program 18, which performs the conversion. To accomplish this, the binarization program includes a threshold determination algorithm or subroutine 22 that identifies the optimal threshold to be employed for converting the gray-scale image. The threshold T is selected by the algorithm 22 on an image by image basis and defines the gray level above which any pixels will be assigned a binary one as belonging to a first intensity related characteristic class (e.g. the foreground) of the image and at or below which, any pixels will be assigned a binary zero as belonging to a second intensity related characteristic class (e.g. the background) of the image. It should be noted that in the case of foreground and background classes, these two can be interchanged depending on whether a black or a white background is employed in the image.

The threshold determination algorithm implements a computational technique that is based on fuzzy entropy measure and is designed to find an optimal binary image threshold without external parameter input. Under the fuzzy reasoning approach, a digital image to be converted is defined as an array of fuzzy singletons, each having a membership value denoting its degree of either being in the foreground or the background of the image. Under this assumption, an image I can be represented as:

$$I = [f(x,y), \mu_I(f(c,y))] \quad (1)$$

Figure 2:
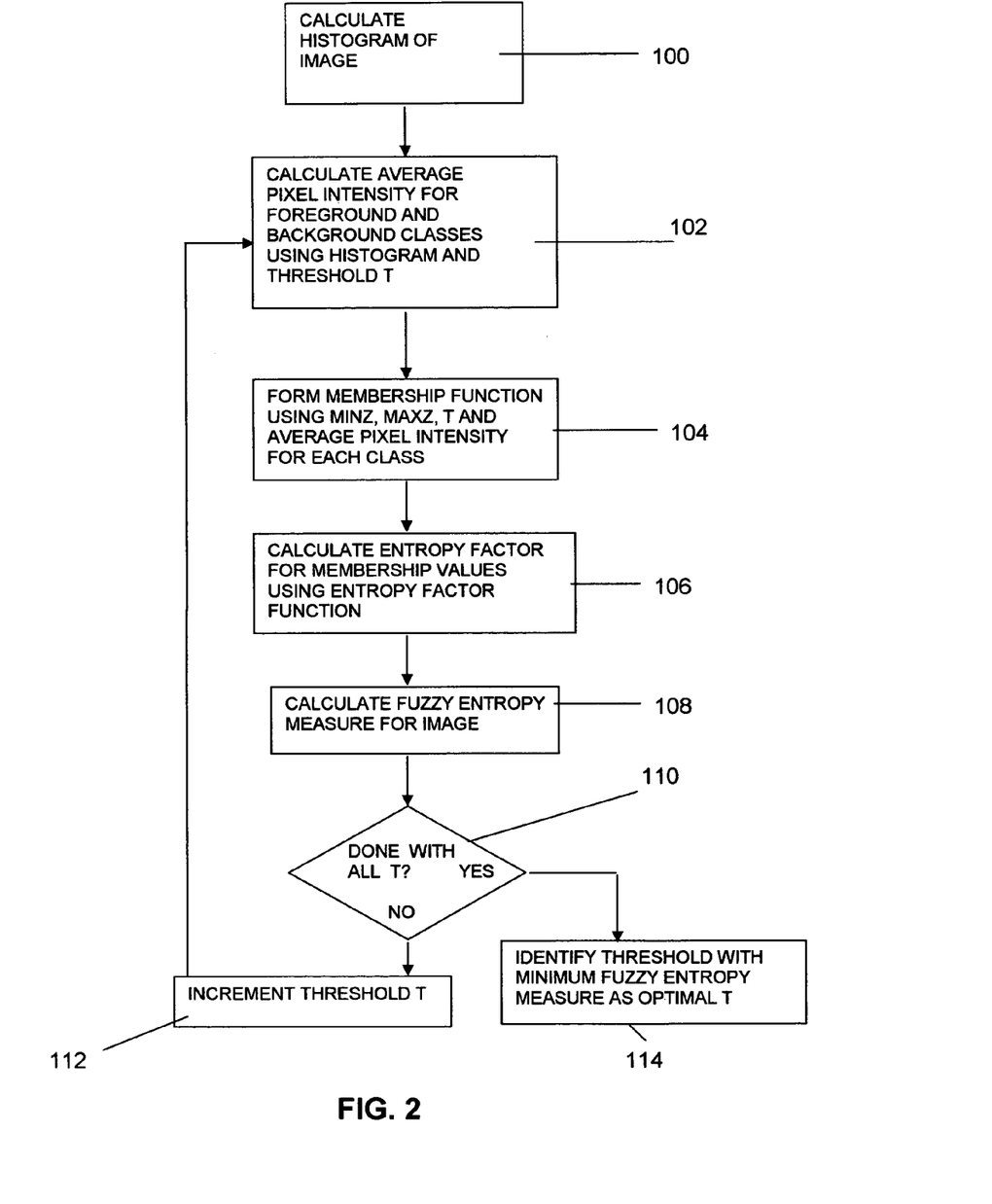
FIG. 2 is a flowchart showing the steps carried out by the threshold determination technique of the preferred embodiment.

In the preferred embodiment, the membership function $\mu_I(f(x,y))$ is defined in terms of the degree that a pixel (x,y)

in the image belongs to one of the two binary classes, background and foreground. The respective membership function in each of these two classes is built based on the average gray level of the pixels in each class, which is computed using the gray-level histogram as an average weight factor. Thus, the first step 100 of the process, as illustrated in the flowchart of FIG. 2, is to calculate the histogram H for the image to be converted by identifying the number of pixels in the image having each of the L possible gray levels z. Next, at step 102, the lowest gray level, MinZ, and the highest gray level, MaxZ, in the image are noted and used with the histogram information and a first selected intensity threshold T to calculate the average gray level for each of the two classes, background and foreground, using equations 2 and 3, respectively:

$$G_1(T) = \sum_{MinZ}^{T}[zH(z)] \bigg/ \sum_{MinZ}^{T}H(z) \qquad (2)$$

$$G_2(T) = \sum_{T+1}^{MaxZ}[zH(z)] \bigg/ \sum_{T+1}^{MaxZ}H(z) \qquad (3)$$

In these equations the Domain is defined as: $0 \leq MaxZ$, MinZ, T, and $z \leq L-1$; where T=Binarization threshold value; z=gray level; MinZ=lowest gray level holding a nonzero histogram value; MaxZ=highest gray level holding a nonzero histogram value; L=total gray-level values (e.g. for an 8-bit image, $L=2^8=256$); H(z)=Image histogram value of gray level z; $G_1(T)$=average gray-level value for class 1 (background); and, $G_2(T)$=average gray-level value for class 2 (foreground).

Figure 3:
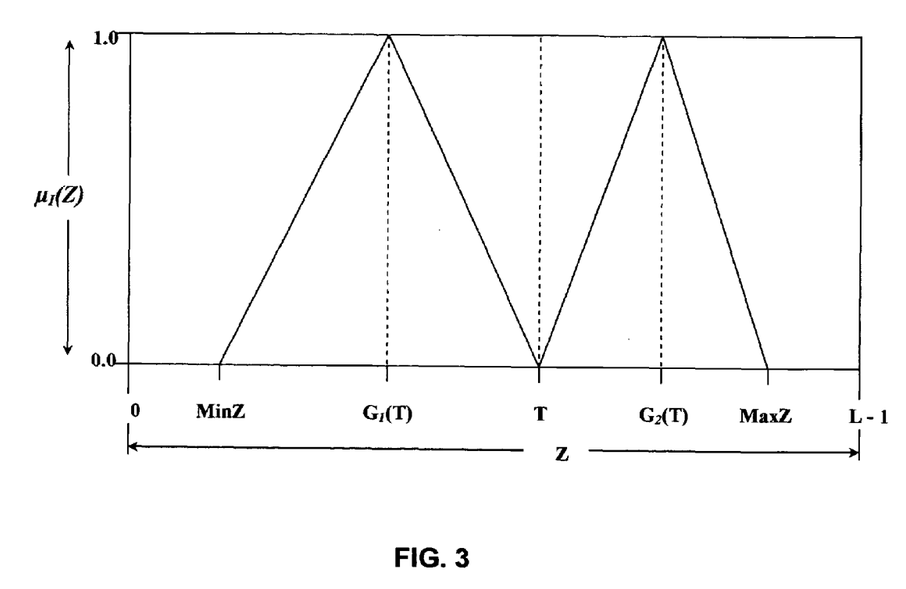
FIG. 3 is a graph illustrating a membership function employed in the threshold determination technique of the preferred embodiment.

Once the foregoing values are determined, the next step 104 of the process is to form the membership function. The membership function is a linear-triangular-type at each one of the two classes (background and foreground) and is defined by the equations 4-7. A graph of the resulting function is illustrated in FIG. 3.

$$\mu_I(z) = \begin{cases} [z-MinZ]/[G_1(T)-MinZ] & \text{if } MinZ \leq z \leq G_1(T) \\ [T-z]/[T-G_1(T)] & \text{if } G_1(T) < z \leq T \\ [z-T]/[G_2(T)-T] & \text{if } T < z \leq G_2(T) \\ [MaxZ-z]/[MaxZ-G_2(T)] & \text{if } G_2(T) < z \leq MaxZ \end{cases} \qquad (4-7)$$

The membership function is thus made up of two triangular sections that are separated from each other by the initially selected threshold value T. The section at or below the threshold T represents pixels that belong to the background (binary 0), while the section above the threshold represents the pixel values that belong to the foreground class (binary 1).

The technique of the preferred embodiment is an iterative one in which no parameters are required to be entered. In the preferred embodiment, an initial threshold of T=MinZ+4 is arbitrarily selected as a starting point and this value is incremented by 1 until all possible thresholds up to MaxZ-2 have been tried to determine which one results in the minimum fuzzy entropy. It should be noted that the range and number of thresholds tested can be selected to be any number desired, although in general, the more possible thresholds that are tested, the more accurate the results.

A modified fuzzy entropy measure of an image is used as the cost function for the selection of the optimal image threshold needed to determine the image pixels that belong to either the background or the foreground of the image. The concept of fuzzy entropy is generally defined in information theory as a measure of information. The image entropy measures the amount of information an image contains using the histogram information and its respective entropy factor that it is built as a function of the triangular-type membership function. The entropy measure function is defined in equation 8:

$$S(T) = \{1/[MN\log 2]\} \sum_{MinZ}^{MaxZ} H(z)Se[\mu_1(z)] \qquad (8)$$

Where, S(T)=fuzzy entropy measure; M=Image rows (number of horizontal pixels); N=image columns (number of vertical pixels); and, $Se[\mu_I(z)]$=fuzzy entropy factor function.

Figure 4:
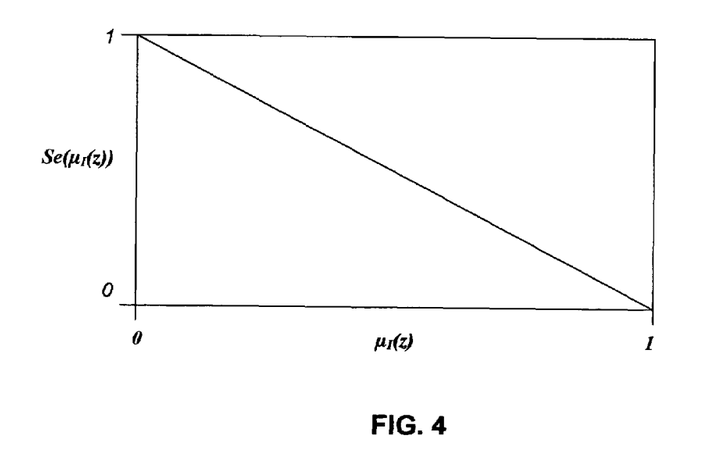
FIG. 4 is a graph illustrating an entropy factor function that is employed in the threshold determination technique of the preferred embodiment.

A simple negative slope linear function defined as $Se[\mu_I(z)]=1-\mu_I(z)$ is selected to calculate the entropy factor since the entropy measure should decrease as the membership value increases (as the fuzziness becomes smaller). $Se[\mu_I(z)]$ is illustrated in FIG. 4.

Thus, once the membership function is determined, the next step 106 of the process is to calculate the entropy factor function $Se[\mu_I(z)]$ from the membership function. Next, the fuzzy entropy measure S(T) is calculated at step 108 using equation 8. The program next determines whether all thresholds have been evaluated at step 110. If not, a new threshold is selected by incrementing T at step 12 and the process of steps 102-108 is repeated.

Once all thresholds have been evaluated, the final step 114 of the process is to select the optimal threshold value $T_{OPTIMAL}$ which is the one of the selected thresholds that results in a minimum fuzzy entropy measure, that is:

$$T_{OPTIMAL} = \arg\min S(T) \text{ where } MinZ \leq T \leq MaxZ \qquad (9)$$

The fuzzy entropy measure S(T) has the following properties. S(T) is large if many pixels have membership close to 0.0 or their gray levels are far from their class average gray levels. It has a maximum value of 1 if all membership values are equal to 0.0. S(T) is small if many pixels have membership values close to 1 or their gray levels are close to their class average gray levels. It has a minimum value 0 if all membership values are equal to 1. $S(T^1) < S(T^2)$ if image $I^1$ with $S(T^1)$ is crisper (less fuzzy) than image $I^2$ with $S(T^2)$. In this case, $I^1$ has pixel gray levels distributed more compactly around the two class average gray levels than $I^2$.

In each of the two binary image classes, background and foreground, the membership value equal to 1 is the largest at the class average gray level and reduces its value as low as 0 when the difference between the pixel gray level and its class average level increases. This means that pixels with gray levels close to their corresponding class average gray levels have less fuzziness or ambiguity and thus can be classified with greater confidence than pixels with gray levels far from their class gray levels. The image entropy measure is used as a cost function to find the optimal threshold (equation 9). It is defined using the histogram information as shown in equation 8. The entropy factor needed to compute the entropy measure is calculated using the simple and fast computational linear function of FIG. 4.

As discussed previously, the proposed method uses a similar but more efficient and faster computational approach than the one used in Huang-Wang method. The Huang-Wang method uses a symmetric membership function that includes all possible gray level values, while the proposed approach uses a more realistic membership function having the highest and lowest gray levels holding nonzero histogram values of the image to be converted as the domain limits. The subject method also does not restrict the range of membership values and uses a straight-line cost function that requires much less computational power than the Shannon function used by Huang-Wang method.

Figure 5A:
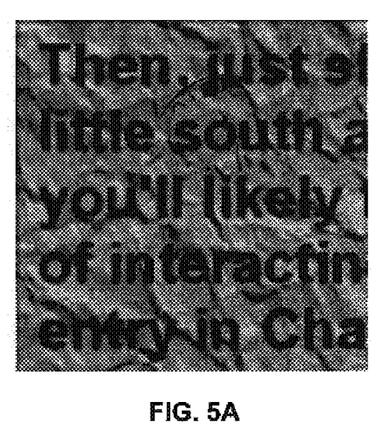
FIG. 5A is a gray-scale image to be converted to binary.
Figure 5B:
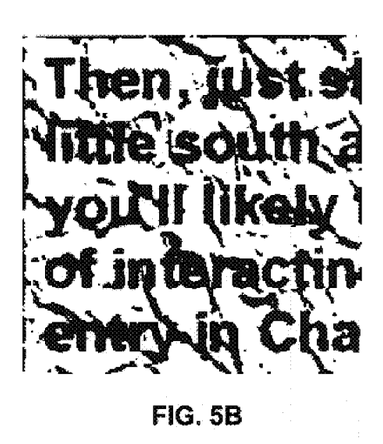
FIG. 5B is a binary representation of the image of FIG. 5A that has been obtained using the known Otsu method.
Figure 5C:
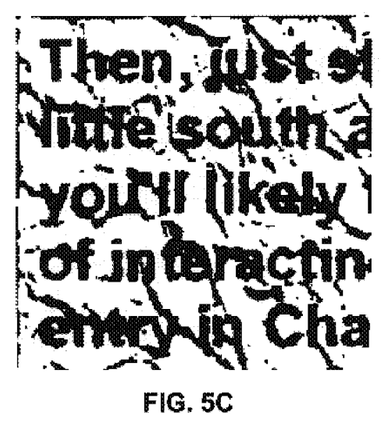
FIG. 5C is a binary representation of the image of FIG. 5A that has been obtained using the known Huang-Wang method; and, FIG. 5D is a binary representation of the image of FIG. 5A that has been obtained using the binarization technique of the preferred embodiment.
Figure 5D:
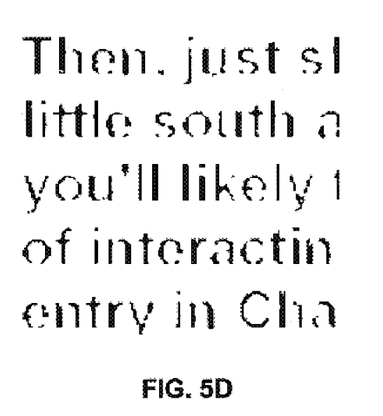

To demonstrate the effectiveness of the subject binarization technique, tests were conducted to compare the subject technique to the prior Otsu and Huang-Wang methods. The results of these tests are illustrated in FIGS. 5A-5D. FIG. 5A shows the gray scale image to be converted to binary, while FIGS. 5B-5D show the resulting binary images using Otsu, Huang-Wang, and the subject methods, respectively. As can readily be observed, the subject method does a much better job of filtering out extraneous background material from the image than either of the two prior techniques. More telling is the execution time. The Otsu method represented by FIG. 5B required a respectable 1.5 milliseconds to convert the image, while the Huang-Wang method took a much longer 10.8 milliseconds. The subject method took 2.0 milliseconds, only slightly longer than the non-fuzzy reasoning based Otsu method and less than $1/5^{th}$ the time of the Huang-Wang method. Thus, for images with textured background and poor printing quality, the subject method has a consistently better overall binarization performance than Huang-Wang and Otsu methods.

Although the invention has been disclosed in terms of a preferred embodiment, it will be understood that modifications and variations could be made thereto without departing from the scope of the invention as set forth in the following claims.

The invention claimed is:

1. A computer-based method for converting a gray-scale multiple pixel image to a binary image comprising the steps of:
    a) loading a gray-scale image from an external source of images into an operating memory of a computer;
    b) determining an optimal threshold value for converting said gray scale image to binary by executing an application with said computer, said application carrying out the steps of:
        1) forming a fuzzy membership function which identifies a membership value for each pixel in said image, said membership function including a first group of gray level values at or below a selected intensity threshold that are designated as corresponding to pixels belonging to a first characteristic class of the image and a second group of gray level values above said selected intensity threshold that are designated as corresponding to pixels belonging to a second characteristic class of said image, said first and second classes being selected from the group comprising a background class and a foreground class;
        2) calculating an entropy factor for each possible membership value by applying a linear entropy factor function to said membership values;
        3) employing said entropy factor to calculate a fuzzy entropy measure for said image with said selected intensity threshold;
        4) repeating steps (1)-(3) for a plurality of additional selected intensity thresholds;
        5) selecting as optimal, a one of said intensity thresholds that provides the lowest fuzzy entropy measure; and
    c) converting said gray scale image to a binary image using said optimal intensity threshold by assigning any pixels in said gray scale image having a gray level above said optimal intensity threshold to a first binary value and assigning any pixels in said gray scale image having a gray level at or below said optimal intensity threshold to a second binary value.

2. The method of claim 1, wherein said membership values are selected to range from 0.0 to 1.0.

3. The method of claim 2, wherein the step of forming said membership function includes identifying a lowest gray level value MinZ and a highest gray level value MaxZ that are present in said image and employing said lowest and highest gray level values as a lower bound and an upper bound respectively, of said membership function, said lowest and highest gray levels each being assigned a membership value of 0.0.

4. The method of claim 3, wherein said entropy measure, S(T), is defined as:

$$S(T) = \{1/[MN\log 2]\} \sum_{MinZ}^{MaxZ} H(z)Se[\mu_1(z)]$$

where, M=number of pixel row in said image; N=number of pixel columns in said image; H(z)=number of pixels in said image having a gray level z; and, Se[$\mu_f(z)$]=fuzzy entropy factor function.

5. The method of claim 4, wherein said linear entropy factor function is defined as 1−$\mu_f(z)$, where $\mu_f(z)$ is the membership value for a gray level z as defined by said membership function.

6. The method of claim 5, wherein a graph of said membership function includes a first triangle representing gray levels belonging to said first characteristic class and having a lower bound at said lowest gray level in said image, an upper bound at said threshold intensity and a peak at an average gray level intensity of said first characteristic class where said membership value is 1.0; and, a second triangle representing gray levels belonging to said second characteristic class and having a lower bound at said threshold intensity, an upper bound at said highest gray level in said image and a peak at an average gray level intensity of said second characteristic class where said membership value is 1.0.

7. The method of claim 3, wherein a graph of said membership function includes a first triangle representing gray levels belonging to said first characteristic class and having a lower bound at said lowest gray level in said image, an upper bound at said threshold intensity and a peak at an average gray level intensity of said first characteristic class where said membership value is 1.0; and, a second triangle representing gray levels belonging to said second characteristic class and having a lower bound at said threshold intensity, an upper bound at said highest gray level in said image and a peak at an average gray level intensity of said second characteristic class where said membership value is 1.0.

8. The method of claim 2, wherein said linear entropy factor function is defined as 1−$\mu_f(z)$, where $\mu_f(z)$ is the membership value for a gray level z as defined by said membership function.

9. A computer-based method for converting a gray-scale multiple pixel image to a binary image comprising the steps of:
  a) loading a gray-scale image from an external source of images into an operating memory of a computer;
  b) determining an optimal threshold value for converting said gray scale image to binary by executing an application with said computer, said application carrying out the steps of:
    1) forming a fuzzy membership function which identifies a membership value for each gray level in said image, said membership function including a first group of gray level values at or below a selected intensity threshold that are designated as corresponding to pixels belonging to a first characteristic class of the image and a second group of gray level values above said selected intensity threshold that are designated as corresponding to pixels belonging to a second characteristic class of said image, said first and second classes being selected from the group comprising a background class and a foreground class; a graph of said membership function including a first triangle representing gray levels belonging to said first characteristic class and having a lower bound at a lowest gray level MinZ that is present in said image where a membership value of 0.0 is assigned to MinZ, an upper bound at said selected threshold intensity T and a peak at an average gray level intensity of said first characteristic class where said membership value is 1.0; and, a second triangle representing gray levels belonging to said second characteristic class and having a lower bound at said selected threshold intensity T, an upper bound at a highest gray level MaxZ that is present in said image and a peak membership value at an average gray level intensity of said second characteristic class where said membership value is 1.0;
    2) calculating an entropy factor for each possible membership value by applying a linear entropy factor function, $Se[\mu_f(z)]$, to said membership values, $\mu_f(z)$, where $SE[\mu_f(z)]=1-f(z)$ for each gray level z in said image;
    3) employing said entropy factor to calculate a fuzzy entropy measure S(T) for said image with said selected intensity threshold T by using the equation:

$$S(T) = \{1/[MN\log 2]\} \sum_{MinZ}^{MaxZ} H(z)Se[\mu_1(z)]$$

where, M=number of pixel row in said image; N=number of pixel columns in said image; and,
H(z)=number of pixels in said image having gray level z;
    4) repeating steps 1)-3) for a plurality of additional selected intensity thresholds; and
    5) selecting as optimal, a one of said intensity thresholds that provides the lowest fuzzy entropy measure; and
  c) converting said gray scale image to a binary image using said optimal intensity threshold by assigning any pixels in said gray scale image having a gray level above said optimal intensity threshold to a first binary value and assigning any pixels in said gray scale image having a gray level at or below said optimal intensity threshold to a second binary value.

10. A computer system for converting for converting a gray-scale multiple pixel image to a binary image comprising:
  a) a processor;
  b) an operating memory readable by said processor;
  c) an external source of multiple pixel gray scale digital images; and
  d) a program embodied in said operating memory and executable by said processor for performing process steps for retrieving a multiple pixel gray scale digital image from said external source and converting said multiple pixel gray scale digital image into a binary image, said process steps comprising:
    1) forming a fuzzy membership function which identifies a membership value for each pixel in said image, said membership function including a first group of gray level values at or below a selected intensity threshold that are designated as corresponding to pixels belonging to a first characteristic class of the image and a second group of gray level values above said selected intensity threshold that are designated as corresponding to pixels belonging to a second characteristic class of said image, said first and second classes being selected from the group comprising a background class and a foreground class;
    2) calculating an entropy factor for each possible membership value by applying a linear entropy factor function to said membership values;
    3) employing said entropy factor to calculate a fuzzy entropy measure for said image with said selected intensity threshold;
    4) repeating steps 1)-3) for a plurality of additional selected intensity thresholds;
    5) selecting as optimal, a one of said intensity thresholds that provides the lowest fuzzy entropy measure; and
    6) converting said gray scale image to a binary image using said optimal intensity threshold by assigning any pixels in said gray scale image having a gray level above said optimal intensity threshold to a first binary value and assigning any pixels in said gray scale image having a gray level at or below said optimal intensity threshold to a second binary value.

11. The system of claim 10, wherein said membership values are selected to range from 0.0 to 1.0.

12. The system of claim 11, wherein the step of forming said membership function includes identifying a lowest gray level value MinZ and a highest gray level value MaxZ that are present in said image and employing said lowest and highest gray level values as a lower bound and an upper bound respectively, of said membership function, said lowest and highest gray levels each being assigned a membership value of 0.0.

13. The system of claim 12, wherein said entropy measure, S(T), is defined as:

$$S(T) = \{1/[MN\log 2]\} \sum_{MinZ}^{MaxZ} H(z)Se[\mu_1(z)]$$

where, M=number of pixel row in said image; N=number of pixel columns in said image; H(z)=number of pixels in said image having gray level z; and, $Se[\mu_f(z)]$=fuzzy entropy factor function.

14. The system of claim 13, wherein said linear entropy factor function is defined as $1-\mu_f(z)$, where $\mu_f(z)$ is the membership value for a gray level z as defined by said membership function.

15. The system of claim 14, wherein a graph of said membership function includes a first triangle representing gray levels belonging to said first characteristic class and having a lower bound at said lowest gray level in said image, an upper bound at said threshold intensity and a peak at an average gray level intensity of said first characteristic class where said membership value is 1.0; and, a second triangle representing gray levels belonging to said second characteristic class and having a lower bound at said threshold intensity, an upper bound at said highest gray level in said image and a peak at an average gray level intensity of said second characteristic class where said membership value is 1.0.

16. The system of claim 12, wherein a graph of said membership function includes a first triangle representing gray levels belonging to said first characteristic class and having a lower bound at said lowest gray level in said image, an upper bound at said threshold intensity and a peak at an average gray level intensity of said first characteristic class where said membership value is 1.0; and, a second triangle representing gray levels belonging to said second characteristic class and having a lower bound at said threshold intensity, an upper bound at said highest gray level in said image and a peak at an average gray level intensity of said second characteristic class where said membership value is 1.0.

17. The system of claim 11, wherein said linear entropy factor function is defined as $1-\mu_f(z)$, where $\mu_f(z)$ is the membership value for a gray level z as defined by said membership function.

18. A computer system for converting for converting a gray-scale multiple pixel image to a binary image comprising:
   a) a processor;
   b) an operating memory readable by said processor;
   c) an external source of multiple pixel gray scale digital images; and
   d) a program embodied in said operating memory and executable by said processor for performing process steps for retrieving a multiple pixel gray scale digital image from said external source and converting said multiple pixel gray scale digital image into a binary image said process steps comprising: :
   1) forming a fuzzy membership function which identifies a membership value for each gray level in said image, said membership function including a first group of gray level values at or below a selected intensity threshold that are designated as corresponding to pixels belonging to a first characteristic class of the image and a second group of gray level values above said selected intensity threshold that are designated as corresponding to pixels belonging to a second characteristic class of said image, said first and second classes being selected from the group comprising a background class and a foreground class; a graph of said membership function including a first triangle representing gray levels belonging to said first characteristic class and having a lower bound at a lowest gray level MinZ that is present in said image where a membership value of 0.0 is assigned to MinZ, an upper bound at said selected threshold intensity T and a peak at an average gray level intensity of said first characteristic class where said membership value is 1.0; and, a second triangle representing gray levels belonging to said second characteristic class and having a lower bound at said selected threshold intensity T, an upper bound at a highest gray level MaxZ that is present in said image and a peak membership value at an average gray level intensity of said second characteristic class where said membership value is 1.0;
   2) calculating an entropy factor for each possible membership value by applying a linear entropy factor function, $Se[\mu_f(z)]$, to said membership values, $\mu_f(z)$, where $Se[\mu_f(z)]=1-\mu_f(z)$ for each gray level z in said image;
   3) employing said entropy factor to calculate a fuzzy entropy measure S(T) for said image with said selected intensity threshold T by using the equation:

$$S(T) = \{1/[MN\log 2]\} \sum_{MinZ}^{MaxZ} H(z)Se[\mu_1(z)]$$

where, M=number of pixel row in said image; N=number of pixel columns in said image; and, H(z)=number of pixels in said image having gray level z;
   4) repeating steps 1)-3) for a plurality of additional selected intensity thresholds;
   5) selecting as optimal, a one of said intensity thresholds that provides the lowest fuzzy entropy measure; and
   6) converting said gray scale image to a binary image using said optimal intensity threshold by assigning any pixels in said gray scale image having a gray level above said optimal intensity threshold to a first binary value and assigning any pixels in said gray scale image having a gray level at or below said optimal intensity threshold to a second binary value.

* * * * *